April 17, 1962 K. H. DATE ET AL 3,030,476

AUTOMATIC CIRCUIT INTERRUPTER

Original Filed Feb. 14, 1957 7 Sheets-Sheet 1

INVENTORS.
Kazuo Henry Date
Anthony Van Ryan
BY Ralph G. Hohenfeldt
Attorney

AUTOMATIC CIRCUIT INTERRUPTER

Original Filed Feb. 14, 1957

7 Sheets-Sheet 2

INVENTORS.
Kazuo Henry Date
Anthony Van Ryan
BY [signature]
Attorney

April 17, 1962 K. H. DATE ET AL 3,030,476

AUTOMATIC CIRCUIT INTERRUPTER

Original Filed Feb. 14, 1957 7 Sheets-Sheet 3

INVENTORS.
Kazuo Henry Date
Anthony Van Ryan

BY Ralph D. Hohenfeldt
Attorney

AUTOMATIC CIRCUIT INTERRUPTER

Original Filed Feb. 14, 1957

INVENTORS.
Kazuo Henry Date
Anthony Van Ryan
BY Ralph G. Hohenfeldt
Attorney

AUTOMATIC CIRCUIT INTERRUPTER

Original Filed Feb. 14, 1957

INVENTORS.
Kazuo Henry Date
Anthony Van Ryan
BY Ralph D. Hohenfeldt
Attorney

AUTOMATIC CIRCUIT INTERRUPTER

Original Filed Feb. 14, 1957

INVENTORS.
Kazuo Henry Date
Anthony Van Ryan
BY Ralph G. Hohenfeldt
Attorney

April 17, 1962 K. H. DATE ET AL 3,030,476

AUTOMATIC CIRCUIT INTERRUPTER

Original Filed Feb. 14, 1957 7 Sheets-Sheet 7

INVENTORS.
Kazuo Henry Date
Anthony Van Ryan
BY
Ralph D. Hohenfeldt
Attorney

United States Patent Office 3,030,476

Patented Apr. 17, 1962

3,030,476

AUTOMATIC CIRCUIT INTERRUPTER

Kazuo Henry Date, South Milwaukee, Wis., and Anthony Van Ryan, Ocean Springs, Miss., assignors to McGraw-Edison Company, Milwaukee, Wis., a corporation of Delaware Original application Feb. 14, 1957, Ser. No. 640,167. Divided and this application Feb. 16, 1959, Ser. No. 795,888

1 Claim. (Cl. 200—150)

This invention relates to improvements in an automatic circuit interrupter of the type commonly known as a dual time-current characteristic recloser.

Reclosers are generally installed in electrical distribution systems adjacent each other in a main line or at the origin of a branch line which in turn supplies other subsidiary lines that are protected by fuses. In the event that a fault occurs on the line ahead of it, the recloser is usually adjusted to execute a sequence of at least two fast opening operations and somewhat delayed reclosing operations during which time most faults will clear without melting the fuse. The relationship of the fault current to the time required for opening the interrupter during the fast opening operations is such that the recloser is faster than the melting time-current characteristic of the fuse so the recloser itself is relied upon as a sole means for attempting to clear the fault without damage to the fuse.

In instances where the fault is not cleared during a fast opening sequence the recloser automatically changes its time-current characteristic so that further opening operations are retarded to the extent that there is sufficient time to melt the fuse provided the fault current is of great enough magnitude. If the fault clears due to melting the fuse or for other reasons during any of the successive operations, the recloser closes and maintains power on the line. If the fault does not clear during the total sequence of fast and retarded opening operations, the recloser automatically locks out and disconnects the branch line being protected from its source. In order to properly coordinate a particular recloser with other reclosers and fuses it is imperative that the recloser have a predictable time-current characteristic throughout its entire expected fault current range. Also, the number of instantaneous opening operations, the number of retarded operations, and the total number of operations to effect lockout must be under convenient control of the customer at the time of installation.

Although prior art reclosing circuit interrupters have been used with considerable success, they have not always demonstrated optimum precision and uniformity insofar as time-current characteristics are concerned because of erratic behavior resulting from variations in manufacturing tolerances and unpredictable dynamics over a widely varying range of currents between minimum trip current setting and maximum fault current interrupting rating.

Another problem is that of enabling the customer to conveniently select the total number of operations which the recloser is to execute before locking out and to select the number of fast operations before retarded operations are put into effect.

Another problem in prior art reclosers is assuring that fault current interruption is initiated at a definite time during each operation following occurrence of a fault and that interruption is completed with utmost rapidity but without bounce or recoil of the moving parts forming the interrupting switch means to the end that proper coordination will not be defeated by sustaining the interruption process for any but the most abbreviated interval.

An object of the present invention is to provide a reclosing circuit interrupter that utilizes a portion of the energy obtainable from a series electromagnet conducting fault current for the purpose of establishing a precise commencement and termination of a time delay period which is followed by a quick opening of the interrupter switch means.

Another object of this invention is the provision of a circuit interrupter that responds to occurrence of a fault by first applying substantially all of the fault current energy to a magnetic plunger for carrying out a timing interval that begins and ends before interruption commences and then by applying substantially all of the fault current energy to opening the switch means.

A further object, to be considered in conjunction with the aforegoing objects, is the provision of a hydraulic timing mechanism that includes an integrating piston adapted to advance in a step-by-step manner, by means of fluid displaced from a hydraulic pump, toward a lockout means actuating position and toward a position where the integrating piston automatically converts the fast interrupter switch openings to retarded openings by blocking a fluid escape orifice and wherein the hydraulic mechanism is novel in the respect that it is ineffective to allow operation of the switch opening mechanism until after the opening time delay interval has been completed. An important corollary of this object being that the escape orifice cannot be partially blocked by the integrating piston so as to alter the timing characteristic of the interrupter while it is executing a particular opening operation, but rather, that the integrating piston will only advance after timing of that operation is completed.

Another object of the present invention is to initiate opening of the interrupting switch means by sharply impacting the movable contact means by the magnetic plunger at the exact moment in which the time delay function of the plunger is completed and at which time the plunger is substantially unimpeded and is traveling at maximum velocity.

A further object of the present invention is to provide in a dual time-current characteristic recloser adjustable means for conveniently selecting the total number of opening and reclosing operations prior to lockout and for selecting in any operational sequence, the number of fast and retarded switch openings. An adjunct to this object being that the operating characteristic of the interrupter is subject to the discretion of the customer so that the recloser may be readily coordinated with others like it and with fuses in the same distribution system.

A further object of this invention is to incorporate an improved interrupting switch means that is capable of clearing fault currents with great rapidity and which interrupting switch is simple in form, economical to manufacture and easy to maintain or replace.

Another important object is to provide an interrupting switch means having movable components that are suddenly arrested in their motion by a highly simplified means for preventing contact rebound with a view toward obviating arc restrikes and thereby improving reliability and coordination with fuses.

It is a general object of the invention to provide a new and improved automatic reclosing circuit interrupter that has precise time-current characteristics and a higher and more efficient current interrupting capacity for an equivalent size than those heretofore known. Other more specific objects may be observed periodically throughout the course of the ensuing specification.

The novel interrupter will first be described in general terms and then in detail in connection with the following drawings in which.

Figure 1:
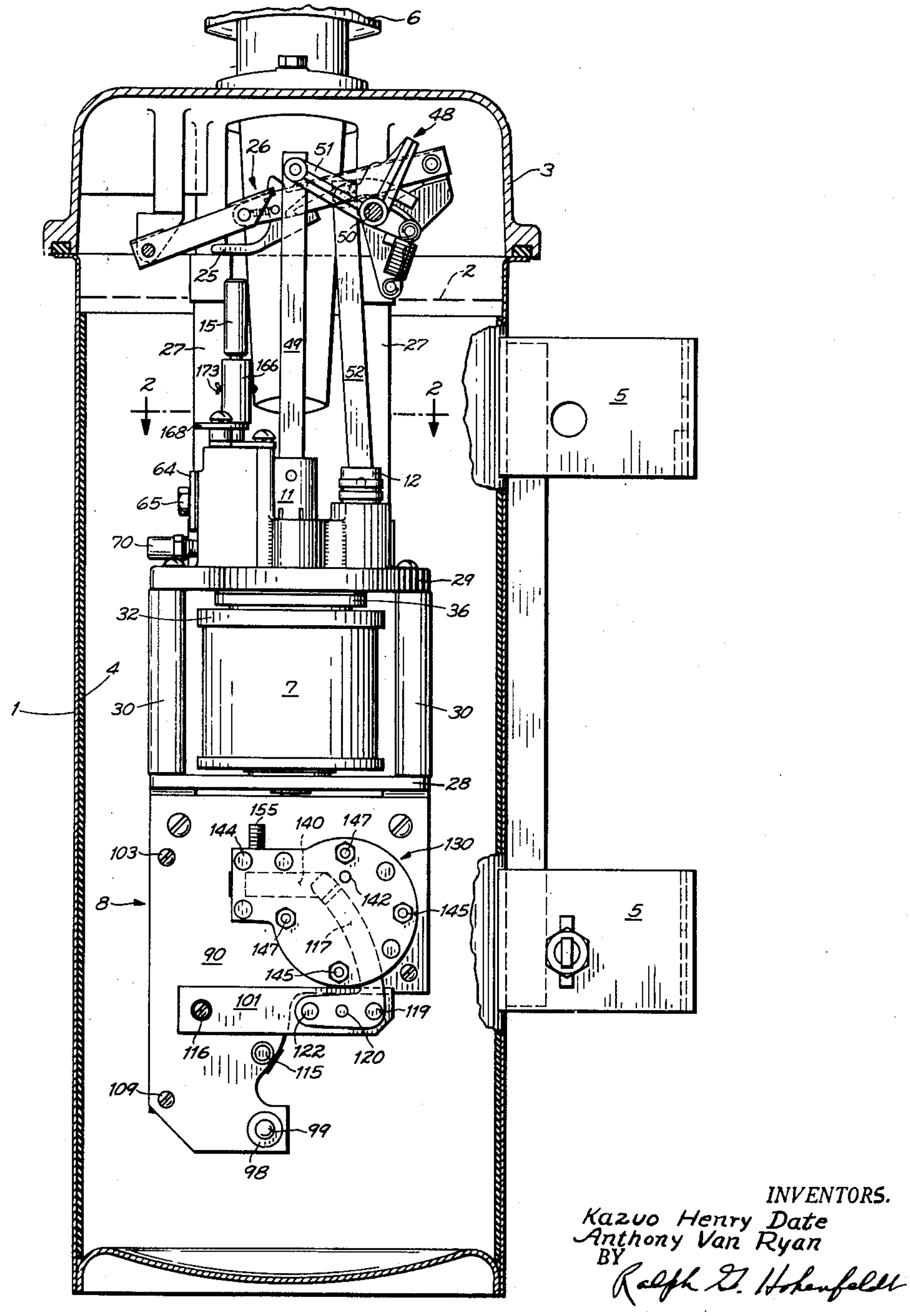
FIG. 1 is a vertical sectional elevational view, with parts broken away, of a reclosing circuit interrupter assembly embodying the invention.

Before proceeding with a detailed description of the invention, an outline of the general construction and mode of operation of the novel circuit interrupter will be set forth primarily in reference to FIG. 1. Referring to that figure, it will be seen that the interrupter comprises a metal tank 1 filled with dielectric fluid such as oil to the level indicated by the dashed line 2 and provided with a gasketed cover 3 and an insulating liner 4. Tank 1 is adapted to be mounted on a transmission pole by means of brackets 5 which may be affixed to the tank by any suitable means such as welding. Cover 3 is provided with a pair of bushings 6, one of which is shown, for the purpose of serially connecting the recloser in a power line. The current path through the recloser between the two bushings constitutes a series circuit including an electromagnetic trip coil 7 and interrupting switch means generally designated by numeral 8. The lead wires extending through the bushings and connecting the electromagnet coil 7 and switch means 8 in series are omitted for the sake of clarity. A magnetic plunger 11 is adapted to be drawn downwardly into coil 7 when a minimum trip current is reached upon which event the interrupting switch means 8 is opened and series coil 7 is de-energized. Means, to be discussed later, are provided for returning plunger 11 to its uppermost position following each successive switch opening and de-energization of the series coil 7.

Figures 2, 3:
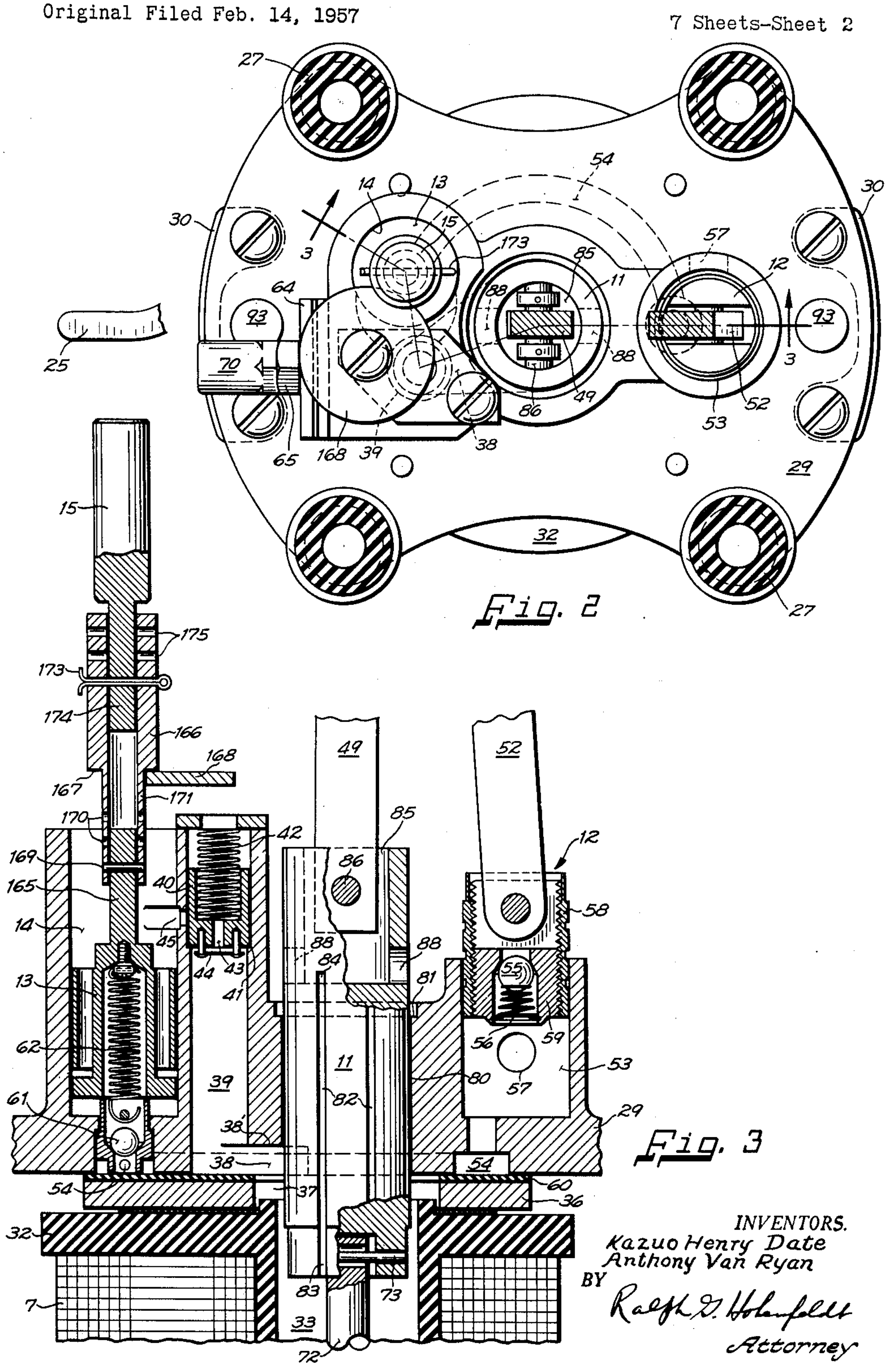
FIG. 2 is a top plan view, partly in section, taken on the line 2—2 of FIG. 1 showing components constituting the timing and integrating elements of the interrupter.
FIG. 3 is a vertical elevational sectional view taken on the irregular broken line 3—3 in FIG. 2.

Each time plunger 11 descends it causes a pump piston 12 to deliver a measured quantity of oil under an integrating piston 13, see FIG. 3, which elevates step-by-step in a cylinder 14 and accordingly causes similar advancement of a trip stem extension 15. After a predetermined number of such operations, usually four, trip stem extension 15 advances to where it strikes a latch finger 25 controlling a spring-biased toggle-link lockout mechanism 26. Collapse of the toggle-link mechanism causes plunger 11 to descend and hold the interrupter switch means 8 open permanently or until the toggle mechanism is reset manually.

The first in a series of such opening operations are usually quickly completed following the occurrence of a fault and those operations following in close succession are retarded automatically in order to give the interrupter a dual time-current characteristic. This matter will be discussed in greater detail hereinafter.

The general features of the interrupter thus far outlined are well established in the art and for those who are interested further discussion of them may be found in Patent No. 2,560,831, issued to A. Van Ryan et al. July 17, 1951, and No. 2,710,895, issued to R. S. Frederickson June 14, 1955, both of which are assigned to the predecessor of the instant assignee.

Attention is now turned to a more detailed description of the novel recloser. Its operating mechanism is suspended from cover 3 by means of insulating stringers 27, two of which are shown in FIG. 1, so that the entire mechanism in tank 1 may be removed with cover 3. The fault responsive element is the series electromagnet coil 7 which is interposed between a lower magnetic plate member 28 and an upper magnetic member 29 constituting the timing mechanism casting. The two magnetic members 28 and 29 are tied together by a pair of vertical metal posts 30 for the purpose of completing a magnetic circuit about coil 7.

The series coil 7 is rated according to its normal full load current and it is adapted to attract magnetic plunger 11 downwardly when the current to the coil exceeds twice normal current, this being known as the minimum trip current of the interrupter. Coil 7 is wound on a flanged insulating spool 32 provided with a central bore 33 constituting the cylinder in which the magnetic plunger 11 reciprocates during opening and closing operations. The lower end of spool 32 is gasketed at 34 and bears near its short radius central portion on the shoulders of a guide plug 35 fastened by any suitable means such as a press fit in the bottom plate 28 of the magnetic circuit about the coil 7.

Between the upper face of flanged spool 32 and the hydraulic timing mechanism casting 29 there is interposed an annular ring 36. The bore 37 of annular ring 36, see FIG. 3, communicates with the plunger cylinder 33 of the spool 32 and there is a discharge orifice 38, see FIGS. 2 and 3, which connects a slide valve cylinder 39 with the plunger cylinder 33. It is evident that when plunger 11 is attracted downwardly, fluid in cylinder 33 is displaced and discharged through orifice 38 into slide valve cylinder 39.

At the top of cylinder 39 there is a slide valve 40 normally biased against a shoulder 41 by means of a compression spring 42. Slide valve 40 is provided with a small orifice 43 that is closed by a disc valve 44 under the influence of hydraulic pressure developed in slide valve cylinder 39 when plunger 11 moves downwardly. During opening operations of the recloser, fluid pressure developed by the descent of plunger 11 causes disc valve 44 to close orifice 43 and slide valve 40 to be elevated in opposition to compression spring 42. Under these circumstances, slide valve 40 opens an escape orifice 45 which leads from slide valve cylinder 39 to the integrating piston cylinder 14. The last mentioned cylinder is open at its top so that fluid rejected from escape orifice 45 is free to discharge into the body of dielectric fluid stored in tank 1. During fast opening operations of the interrupter, fluid displaced by plunger 11 escapes so rapidly through the escape orifice 45 that there is very little impedance of the plunger descent. Retarded or time delay openings are brought about when integrating piston 13 advances to close escape orifice 45.

It will be explained shortly hereinafter that plunger 11 operates an interrupter switch assembly 8 each time the plunger descends. The same assembly includes over center spring means for returning the plunger upwardly to its normal position as viewed in FIG. 3 as soon as the interrupter switch opens and magnet coil 7 is de-energized. During the return stroke or ascent of plunger 11, slide valve 40 drops downwardly and stops on shoulder 41 to close escape orifice 45 and the only fluid that can be drawn into plunger cylinder 33 for permitting plunger 11 to rise is that which is throttled through the small orifice 43 around the disc valve 44 in the slide valve. Thus, reclosing of the interrupter is somewhat time delayed to provide time for a fuse to cool or a fault to clear.

Note that plunger 11 is connected to an L-shaped lever 48 by means of an insulating link 49. Lever 48 is journalled loosely on a main shaft 50 to which an external manual operating handle, not shown, is fastened (see the above cited Fredrickson patent). An arm 51 of lever 48 which supports the plunger link 49 also has pivotally connected to it at a shorter radius with respect to shaft 50 another insulating link 52 which actuates a pump piston assembly 12. Each time plunger 11 descends, piston 12 also descends and forces definite quantity of fluid from the pump cylinder 53 through semicircular duct 54 milled in the bottom of casting 29 for placing the integrating piston cylinder 14 and pump cylinder 53 in communication. The bottom of duct 54 is closed by a gasket 60 compressed against ring 36. Pump piston 12 is effective to displace fluid only on a downward stroke by reason of it being provided with a ball check assembly including a ball 55 and a spring 56, see FIG. 3. When the downward stroke of pump piston 12 is initiated, fluid is freely discharged through a relief aperture 57 through the wall of cylinder 53. Piston 12 becomes effective to displace fluid into the integrating piston cylinder 14 upon fully closing the relief aperture 57. This cut-off point may be controlled or adjusted by axially moving an internally threaded shell 58 surrounding the piston body 59. By reference to FIG. 5 it will be noted that the effective point in the pump piston stroke begins when arm 51 of L-shaped lever 48 is substantially in a horizontal position. This means that the vertical component of the arm 51 angular velocity is greatest when pumping is initiated.

As explained before, each stroke of pump piston 12 delivers a definite quantity of fluid through duct 54 into integrating piston cylinder 14. Integrating piston cylinder 14 has at its bottom a ball check 61 which permits easy ingress of fluid to cylinder 14 but prevents discharge back into the duct 54. During a closely successive series of plunger 11 and pump 12 operations, the measured quantities of fluid urge the integrating piston assembly 13 upwardly in cylinder 14. If the successive series of interrupter operations do not terminate in lockout, integrating piston 13 will slowly resettle from an intermediate position to its original lowermost position as shown in FIG. 3 under the influence of a return spring 62. During step-by-step advancement of integrating piston 13, integrating piston 13 advances to a position where it closes escape orifice 45 and prevents discharge of fluid therethrough from slide valve cylinder 39. This produces back pressure and retards operation of plunger 11, and accordingly, time delays opening of the interrupter following occurrence of a fault. During retarded operations of the plunger, slide valve 40 is, of course, urged upwardly but this has little effect on relieving pressure in slide valve cylinder 39 because disc valve 44 closes small orifice 43 in the slide valve body. Thus, the only escape for fluid during retarded operations is that which occurs as a result of leakage. It will be explained more fully hereinafter how, according to the instant invention, the number of fast and retarded operations may be easily selected and how the total number of interrupter operations prior to lockout may be selected.

The relationship of the current traversing coil 7 to the time in which the interrupting switch 8 opens, or in other words, the shape of the time-current characteristic curve of the interrupter may be preselected for coordination with the particular fuses applied in a branch circuit by other well known means. One of these is a multi-apertured selector plate 64, see FIGS. 1, 2, 7 and 9, secured against the wall of the slide valve cylinder 39 by means of a cap screw 65 and positioned by an index pin 66. The apertures 67 are of different diameters and are arranged for rotation into registry with a hole 68 that connects with the slide valve cylinder 39. Thus, when slide valve 40 is urged upwardly during either fast or retarded interrupter operations, a certain quantity of fluid displaced by plunger 11 may be discharged through any selected one of the registered apertures 67 to provide variable time delay or retardation.

Another means for effecting a quicker plunger 11 response, particularly during high magnitude faults, is through the agency of a relief valve assembly 70. The relief valve assembly 70 is now well known in the art and need not be explained in detail except to say that when the pressure inside of slide valve cylinder 39 exceeds a certain value, relief valve 70, which may be of the ball check type, is adapted to discharge fluid from the slide valve cylinder 39 to the ambient oil of the tank. Valve 70 acts as a safety relief and tends to make the time-current characteristic curve of the interrupter steeper or faster in the range of high magnitude fault current so that the curve more nearly parallels that of fuses.

Figures 10, 11:
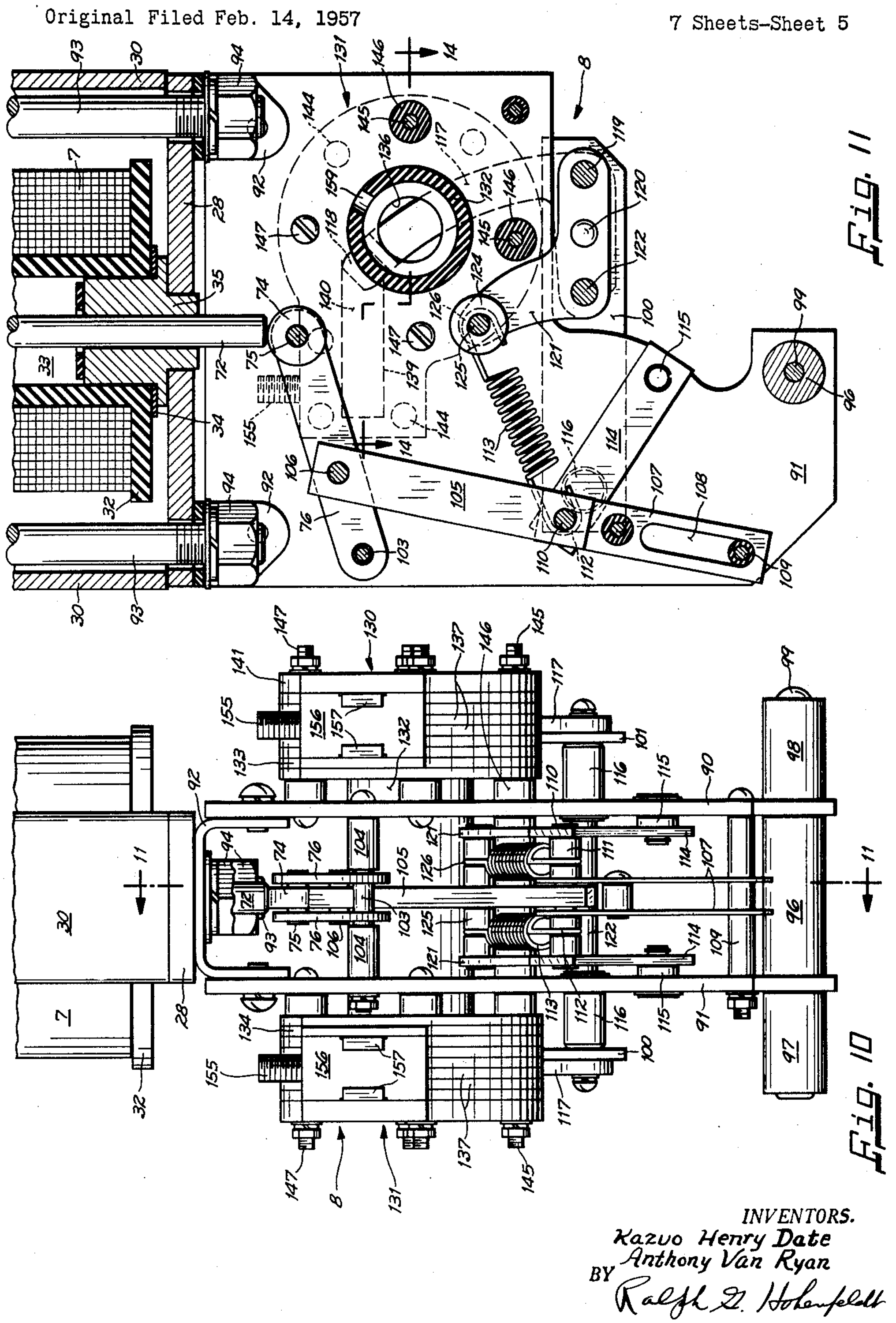
FIG. 10 is an elevational view of the interrupter switch means taken from the left side with respect to FIG. 1.
FIG. 11 is a sectional view taken on the line 11—11 in FIG. 10 showing components of the interrupter switch means as they appear when in normal or closed circuit condition.
Figure 13:
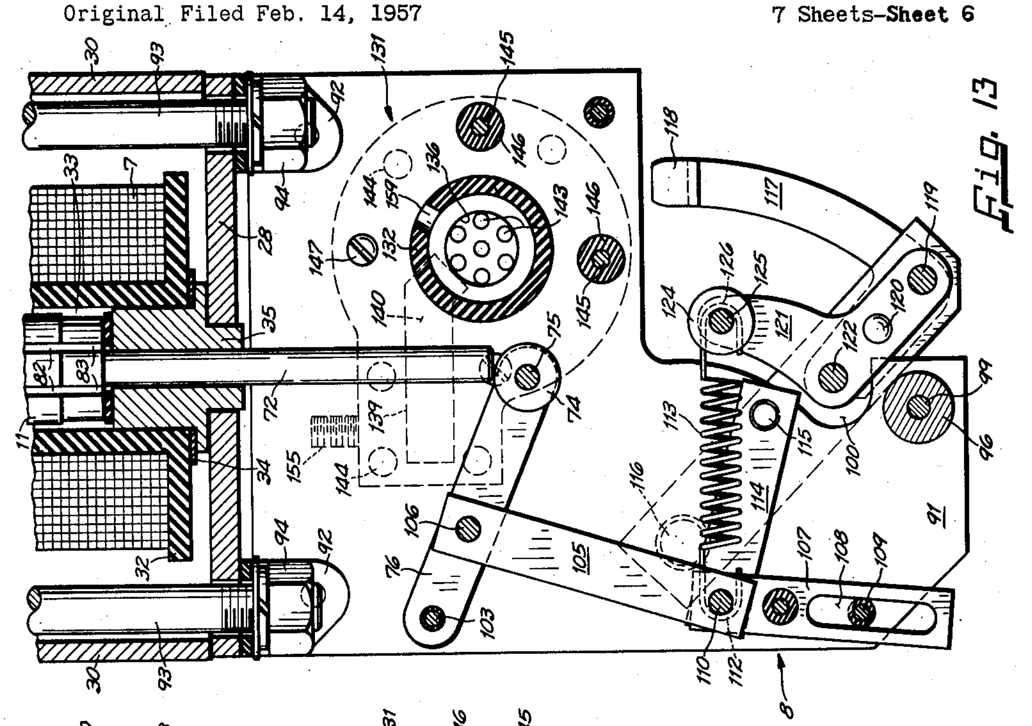
FIG. 13 is similar to the two preceding figures except that the components are shown as they appear when the interrupter switch means is in full open position; and, FIG. 14 is a plan view, partly in section and with parts broken away, of the arc extinguishing structure of the interrupter switch means.

Note that plunger 11 has attached at its lower end a self-aligning downwardly extending switch actuating rod 72 which passes through the plug 35 supporting solenoid spool 32, see FIG. 11 for example. Switch actuating rod 72 is recessed into the end of plunger 11 and is loosely carried on a transverse pin 73 to relieve the effects of any misalignment of the plunger. In FIG. 11 it will be observed that when plunger 11 is in its uppermost position, the lower end of rod 72 bears on a roller 74 rotatably carried on a pin 75 at the end of a pivotal arm 76 forming part of the interrupter switch assembly 8. This is the closed circuit position of the interrupter switch assembly 8. On the other hand, FIG. 13 illustrates that when plunger 11 descends to its lowermost position the interrupter switch is in full open position. The importance of the relationships between the components of the interrupter switch assembly 8 and the various components discussed earlier in connection with describing the hydraulic timing mechanism will be set forth shortly hereinafter.

A more detailed examination of plunger 11 and its associated parts will now be made. Note that the plunger is arranged to slide through a bore 80 in the timing mechanism casting 29. The lower extremity of bore 80 includes the upper surface 38' of the discharge orifice 38, see FIG. 3. The upper extremity of bore 80 is defined by a shoulder 81 countersunk in the upper surface of casting 29 as shown. Plunger 11 is provided with a plurality of axial surface slots 82 opening at their lower ends 83 into cylinder 33 when the plunger is in its uppermost position as in FIG. 3. Slots 82 also normally open above shoulder 81 as seen in FIG. 3 and thereby place cylinder 33 and the ambient fluid in communication when the plunger is up. Hence, when plunger 11 begins its descent in response to a fault, it is incapable of forcing fluid into the slide valve cylinder 39 since the fluid will be freely discharged through the upper end 83 of axial slots 82. This condition is observable in FIG. 3. As plunger 11 begins its descent, however, the upper end 84 of axial slots 82 is closed by passing the shoulder 81 of casting 29. Timing or retardation of plunger 11 stroke then becomes effective because fluid is then principally relieved through the restricted escape orifice 45.

Figure 5:
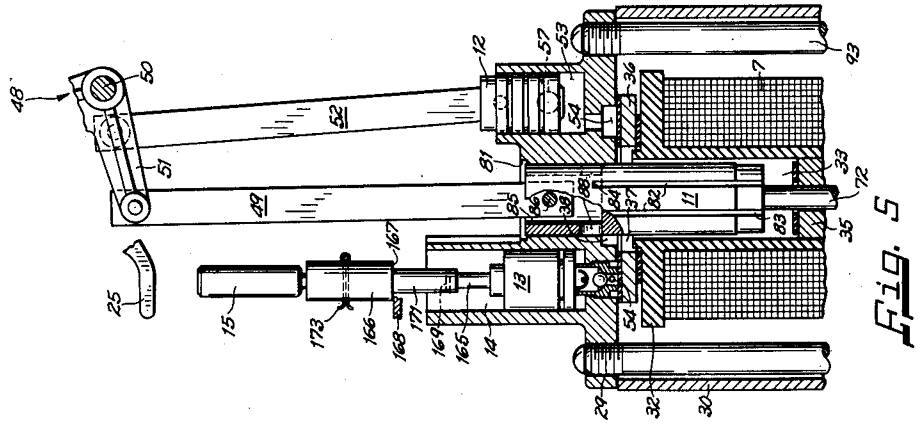
FIG. 5 is a view similar to FIG. 4 but showing the same parts as they appear at the end of a time delay interval following occurrence of a fault on a power system.

Note also that the upper end of plunger 11 is recessed at 85 and provided with a cross pin 86 to which is attached insulating link 49. Recess 85 has radial relief ports 88 which, when the plunger is in its uppermost position, is remotely spaced from discharge orifice 38, see FIGS. 3 and 4. In FIG. 5 it will be noted that relief port 88 descends during a fault current impulse into substantial registry with discharge orifice 38 leading to slide valve cylinder 39. When overlapping of relief port 88 and discharge orifice 38 occurs, all of the pressure developed in the slide valve cylinder 39 by descent of plunger 11 is suddenly relieved to complete the timing interval. After that it is seen that plunger 11 is able to move from an intermediate position in its stroke as shown by FIG. 5 to a final position shown in FIG. 6, entirely unimpeded since any fluid displaced by the plunger 11 is freely discharged from the relief port 88 at this time. It will appear below that the interrupting switch 8 is opened by a sharp impact only after the timing interval is completed.

The effective plunger stroke, and therefore, the timing interval, is governed by precise tolerances in the length of slots 82 and by precisely locating relief port 88. The vertical distance between the extremities 81 and 38′ of casting 29 are also carefully controlled and since these dimensions cannot vary during operation and wear of the recloser, its timing remains constant and uniform throughout its life. Hence, the machining tolerances of any of the other lever mechanism that supports the plunger or of the interrupting switch structure are rather immaterial.

Consider now the relative position of plunger 11 with respect to pump piston 12, both of which are carried on arm 51 of lever 48. When the relief ports 88 of piston 11 begin to register with discharge orifice 38 to permit the plunger to descend unimpeded at the end of the timing interval as shown in FIG. 5, pump piston 12 commences to force fluid into the integrating piston cylinder 14. This is clearly demonstrated in FIG. 5 where relief aperture 57 in the pump cylinder 53 is fully closed by the downward stroke of pump piston 12. Therefore, integrating piston 13 begins to step upwardly towards closing the escape orifice 45 only after the timing operation of the interrupter has been completed. This means that the integrating piston 13 cannot partially close escape orifice 45 and thus vary the shape of the recloser time-current characteristic curve except between interrupter switch operations when it is desirable to automatically transfer from an instantaneous time-current curve to a retarded curve. This is an important aspect of the invention since it allays the ill effects of fluid dynamics suffered with prior art reclosers.

Before proceeding to show the relationship between the plunger 11 at its various positions and the position of the elements comprising the interrupter switch assembly 8, the latter will be described in detail. Referring to FIGS. 1 and 10–14 it will be seen that the interrupter switch 8 comprises a pair of insulating plates 90 and 91 in spaced relationship to each other and each of which is secured to U-shaped mounting brackets 92 by machine screws for example. In FIG. 10 it is evident that the whole interrupter switch assembly 8 is adapted for convenient mounting and exchange by securing the brackets 92 to bolts 93, projecting through posts 30 and base plate 28, by means of a pair of nuts 94. Parallel insulating plates 90, 91 are preferably made of a semi-compressible material such as phenol formaldehyde resin or the like with embedded reinforcing fibres. The parallel plates 90 and 91 are spaced at their bottom edges by means of a metal cylinder 96. In line with cylinder 96 on the outside of each of the plates are laterally extending similar cylindrical members 97, 98, see FIG. 10, which members constitute stops for arresting the motion of a pair of movable contact arms without rebound during the process of interruption. Cylinders 96, 97, 98 are held in coaxial compressive relation by a flared rivet 99 which passes snugly through the cylinders and an appropriate hole through each plate member 90, 91. It is an important feature of the present invention that the mass of cylindrical stop members 96—98 be carefully selected, since, as will appear hereinafter, the value of their masses has an important function in preventing rebound of the movable contact arm 100 of the interrupter assembly.

The operating mechanism of the interrupter switch assembly 8 may be most easily understood by observing FIG. 11 which shows it in closed circuit position. The operating linkage consists in the earlier identified lever 76 carrying a roller 74 at its end for receiving force from plunger 11 through contact actuating rod 72. Lever 76 actually constitutes a pair of congruent levers, see FIG. 10, but it will be described as a single member that is adapted to pivot on a fixed transverse bolt 103, carrying spacer sleeves 104, spanning between parallel insulating plates 90, 91. There is a single link 105 pivotally attached to lever 76 by means of a pin 106. Link 105 has attached near its lower end a pair of thin guide members 107 that are each provided with an elongated slot 108 for the purpose of riding along a fixed guide pin 109. The thin guide members 107 are pivotally connected to solid link 105 by means of a pin 110 and grooved spacers 111 which have attached between them one hooked end 112 of a pair of overcenter coil springs 113. Also pivotally attached to pin 110 is another double member lever 114 mounted on fixed pivots 115 supported on opposite insulating plates 90, 91 as shown and secured by any suitable means such as snap rings.

The mechanism thus far described is adapted to transmit force to a pair of movable contact arms 100, 101 journalled on fixed post pivots 116 secured to opposite insulating plates 90, 91. Contact arms 100, 101 may also be of an insulating material such as phenol formaldehyde resin, for example. Movable contact arms 100, 101 each carry an arcuately shaped switch blade identified by the common numeral 117 of copper or similar highly conductive material provided with tips 118 made of copper-tungsten alloy to prevent their deterioration under the influence of an electric arc which is generated during the interruption process. Blades 117 are serially connected to each other by means including a transverse rivet 119 which extends between them. The arcuate switch blades 117 bear against the outside of the opposite movable contact arms 100, 101 and they are secured further thereto by means of an additional rivet 120. Also secured to each respective movable arm by means of a rivet is a pair of roller support brackets 121 which extend in parallelism at an obtuse angle away from the contact arm 100, see FIG. 11. Another long transverse rivet 122 provided with insulating spacers, not shown, carries the pair of brackets 121. A roller 124 is supported on an axle pin 125 that spans between the two support arms 121. The same pin 125 serves as a means of attaching another hooked end 126 of spring 113.

Figure 6:
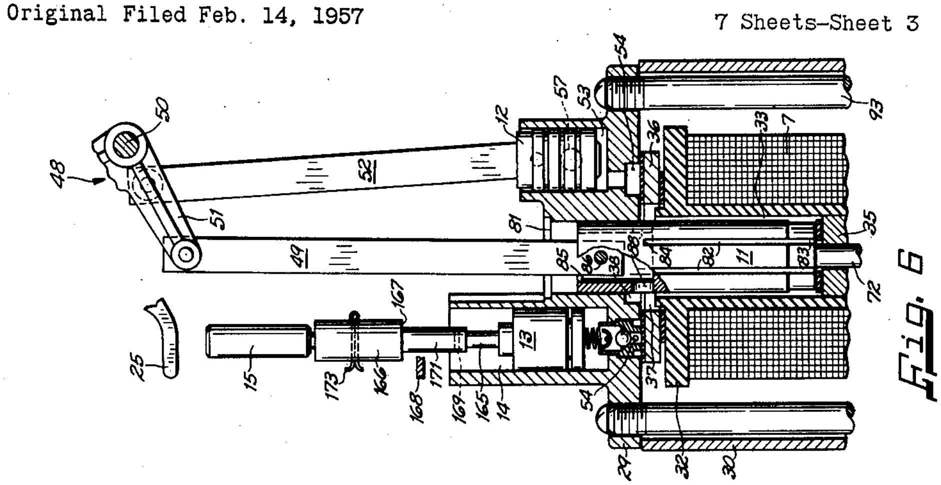
FIG. 6 is similar to the two preceding figures but shows the parts of the interrupter as they appear when the interrupting switch means is in open position.
Figure 4:
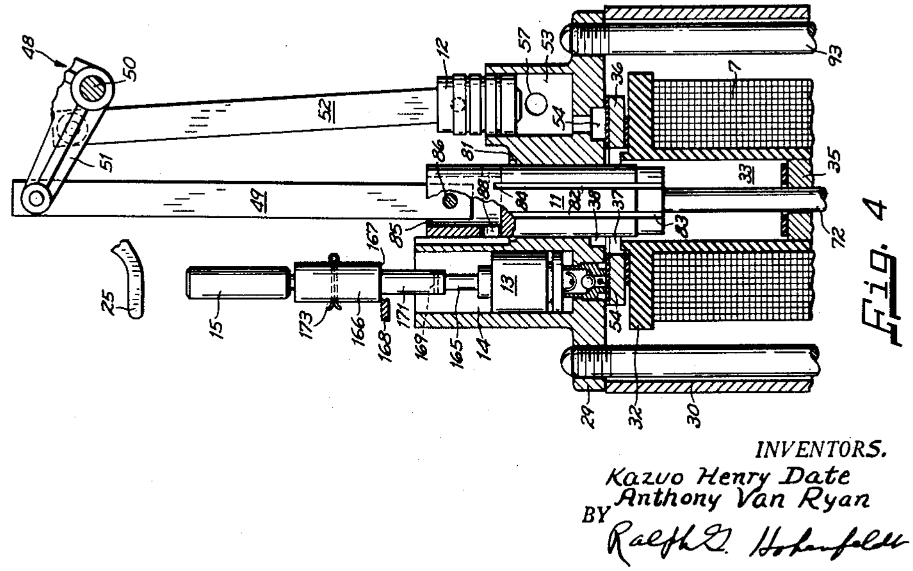
FIG. 4 is a vertical sectional view of parts of the interrupter corresponding with closed circuit position of the interrupting switch means.
Figure 7:
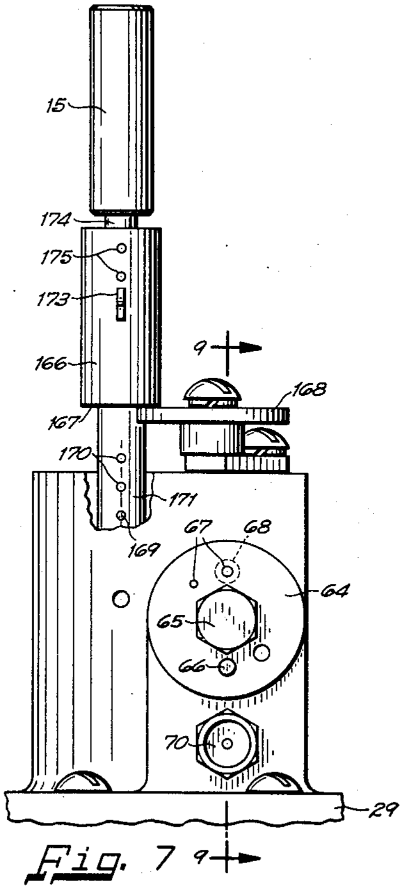
FIG. 7 is a portion of the interrupter timing and integrating mechanism taken from the left side when viewed in respect to FIG. 1.
Figure 12:
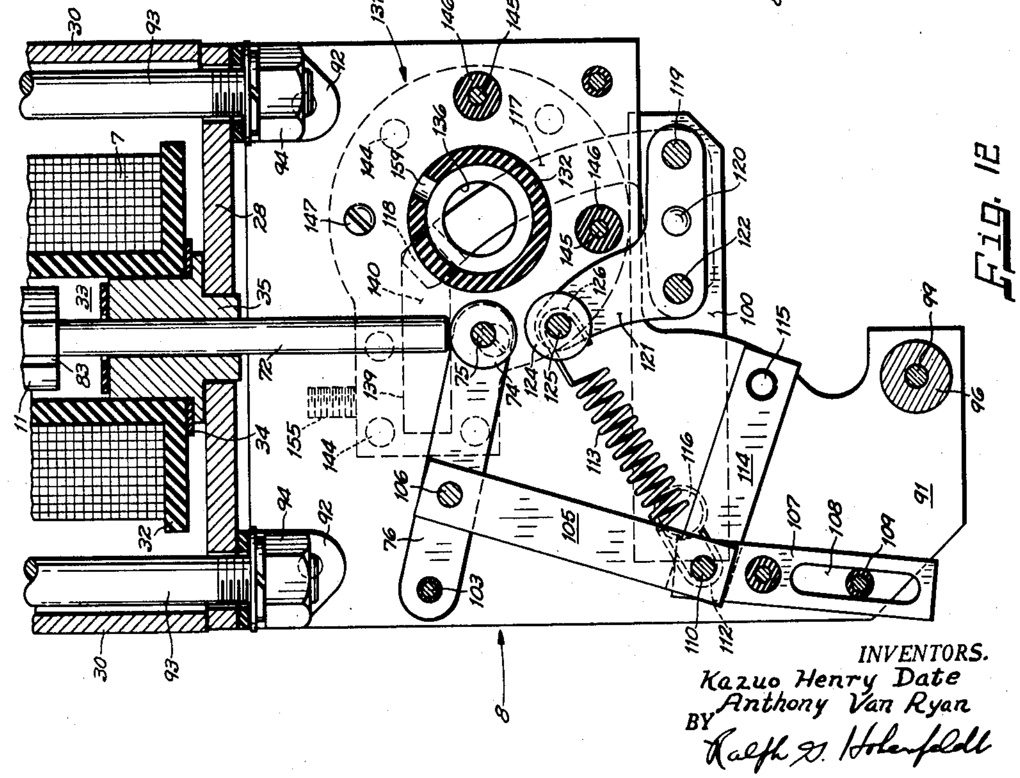
FIG. 12 shows the same components as in FIG. 11 as they appear at the completion of the time delay period following occurrence of a fault.

Operation of the interrupting switch may be most easily comprehended by examining FIGS. 11, 12 and 13 in sequence, which figures, incidentally, correspond with FIGS. 4, 5 and 6 respectively. In FIG. 11, showing the interrupter switch closed, it is seen that the line of action of spring 113 lies through the centers of pins 110 and 125 and above the center of the contact arm pivot pin 116. In this case the force generated by spring 113 is such as to create a counterclockwise moment of force on lever 76 so that plunger rod 72 is held upwardly. When solenoid coil 7 is traversed by minimum trip current, plunger 11 descends to an intermediate position as shown in FIG. 12. This position corresponds with that shown in FIG. 5 and it represents that the timing interval of that particular stroke has been completed. Note in FIG. 12 that coil spring 113 has been fully extended although its line of action still lies above the center of contact arm pivot 116 so that the contact arm has not as yet begun to move. At approximately this time, however, plunger 11 continues its downward movement with an unimpeded quick final portion of its stroke and the actuating rod 72 is about to cause lower roller 124 to be impacted by the upper roller 74. Impacting of these two rollers occurs as the plunger moves from its position in FIG. 12 to that of FIG. 13 and at the same time the line of action of spring 113 passes below the center of pivot 116 so that movable contact arms 100, 101 are jointly rotated to a position where their motion is arrested by collision with heavy masses 97, 98. This condition is exemplified in FIG. 13 where the interrupter is shown in full open position.

If lockout has not occurred, that is, if plunger 11 is not permanently restrained in the downward position of FIG. 13, spring 113 is able to force the plunger 11 upwardly to its original position. This occurs as a result of pin 125, carried in the roller support 121, acting as a fixed pivot point for the overcenter spring 113 and the opposite end 112 of the spring exerting a lifting influence on arm 114 and thereby causing its clockwise rotation about pivot 115. This rotational moment is converted to a translatory force in link 105 that causes counterclockwise rotation of lever 76 and the exertion of a linear force on plunger 11. During closing of the interrupter switch, the line of action of spring 113 passes above contact arm pivot 116 by reason of end 112 of the spring moving through a clockwise arc. Thus, after the plunger has been restored to its uppermost position, the line of action of spring 113 is such that it exerts a counterclockwise influence on contact arms 100, 101 causing closure of the interrupter switch again.

When contact arms 100, 101 swing clockwise during switch opening to a position where they are arrested by the masses 97, 98 there is an enormous amount of kinetic energy which must be dissipated lest the contact arms rebound and cause restriking of the arc drawn on the tips 118 of arcuate or sickle shaped blades 117. A novel and simple way of coping with this problem is here presented. It was discovered that if the dynamic parameters of the colliding movable and stationary elements could be properly coordinated that rebound of the movable contact arm could be minimized if not entirely eliminated. By coordinating the dynamic parameters of the elements is meant that due regard is paid to their kinetic energy expressed in terms of their masses and velocities as well as the materials out of which they are made. Now it is well known in the art how to damp the movement of a rapidly traveling element by applying various force absorbing devices at a proper time, but in the instant case it was discovered that rebound of the movable contact arm arrived at a minimum between two maxima when a certain critical mass was adopted for the cylindrical members 96, 97 and 98 which form the stops for arresting movement of the contact arm. As a practical matter, therefore, contact rebound can be minimized surprisingly easily and with very little experimentation to determine the critical mass of the arresting stops. In the instant case cylinders of different outside diameter were substituted until a point was reached where damping was found to be optimum.

It is difficult, if not impossible, to set forth specific dimensions or characteristics of an anti-rebound arrester applicable to all cases of a circuit interrupter design. But by way of example, in accordance with the present invention, steel cylinders 97, 98 were used although it is possible to use brass or other metal of other than round cross section. In order to apprise those practicing the art of the considerations involved so as to facilitate application of the principle to other practical cases, it may be stated that the substance out of which the spaced insulating plates is made should be yieldable in nature and possess a low coefficient of restitution. That is, it should be a substance such as phenol formaldehyde resin that absorbs a large amount of impact energy by converting the same into heat while it is deforming slightly and which likewise develops further heat by intermolecular friction when the substance is restoring itself to its original position as a result of its inherent resiliency. The metal comprising the stops may be such that it is perfectly elastic but subject to only a small deformation when impacted. In other words, it is rather important that the stops be of hard material and of such magnitude that the mass will translate and cause deformation of the supporting plates as described earlier. If the mass is excessively great no translation of it will occur and the contact arm will rebound sharply, because the mass will not translate sufficiently to compress the supporting material and yield energy thereto as described above. If the mass is stoo small, it will tend to translate at undiminished velocity and therefore recoil sharply. The optimum condition is that where the mass is of such value that it accelerates in the same direction as the contact arm moves after impact occurs and thereby absorbs some of the kinetic energy of the movable contact by exchange of momentum while storing energy in the supporting material. The supporting material must yield its stored energy toward accelerating the mass in the opposite direction at such rate that the mass and movable contact arm remains in contact all during the interval.

It should be appreciated that were it not or space requirements damping could be further augmented by alternately stacking metal masses of critical proportions with masses of laminar semi-compressible material. In the instant case this arrangement is approximated by alternate metal to phenolic layers where metal blades 117 are carried on phenolic arms such as 100 which in turn impact metallic critical masses 97, 98 carried directly on phenolic plates 90, 91.

Figure 14:
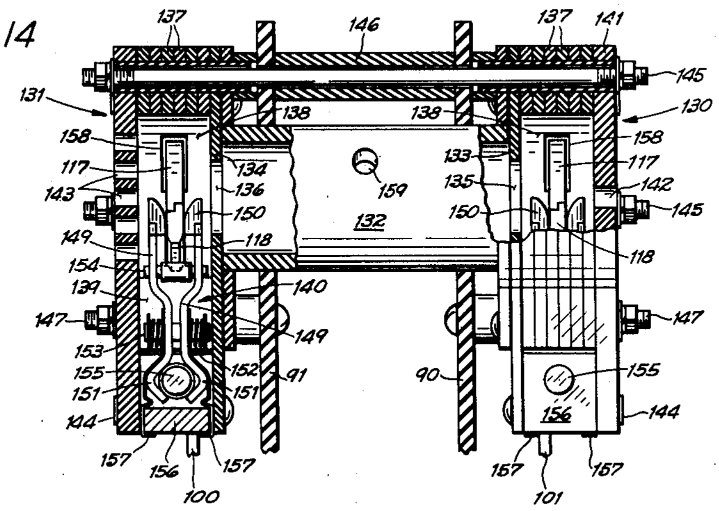

The arc extinguishing structure of the novel interrupter is a fluid immersed type especially adapted to cooperate with arcuate movable contact blades 117. Referring to FIG. 14, it will be seen that the arc extinguishing structure comprises a pressure generating chamber 130 and an exhaust chamber 131 connected by means of a cross blast tube 132 of fiber or similar material. Each chamber 130 and 131 is provided with a wall 133 and 134, respectively, in compressive relation with opposite ends of the cross blast tube 132. The respective walls are apertured at 135 and 136 for the purpose of placing the pressure generating chamber and exhaust chamber in communication.

Each chamber is composed of a plurality of stacked discs 137 having a substantially circular central portion for defining an arcing cavity 138 and a rectangular slot 139 which when congruently stacked forms the cavity housing a stationary contact element designated generally by the reference numeral 140. One end of the pressure generating chamber 130 is closed by means of a relatively thick insulating wall 141 which is substantially imperforate except for a small hole 142 that allows refill of dielectric fluid into the arcing chamber 138 after interruption has occurred.

The outside wall of the exhaust chamber 131, see FIG. 14, is provided with a plurality of small holes 143 for the purpose of discharging the gaseous arc products into the ambient dielectric fluid.

The stacks of apertured discs 137 may be tightly compressed between their walls 133 and 141, for example, to form an individual chamber 130 held together by means such as rivets 144. The chambers 130 and 131 are held in compressive relation to the ends of cross blast tube 132 by means of through bolts 145 provided with suitable spacers 146 between and on opposite sides of parallel insulating plates 90, 91. The individual chambers are further secured to the insulating plates by additional stud bolts 147 provided with insulating sleeves. It will be seen that the chambers 130 and 131 and the cross blast tube 132 form an integral unit with plates 90, 91 so that the whole interrupter switch assembly 8 may be attached to the lower side of the solenoid coil assembly and held only by a pair of nuts 94.

The stationary contact assemblies 140 in each of the chambers 130 and 131 are substantially identical. They comprise a pair of complementary fingers 149 having arcing tips 150 at one end and a right angle offset bend 151 at the other end. Fingers 149 are compressed toward each other by compression springs 152 carried on a pin 153 which extends loosely through each of the fingers. Springs 152 may be retained on the pin by any suitable means such as snap rings or washers, for example. Fingers 149 are further guided, held in alignment with each other, and limited in inward movement by a double shoulder pin 154.

The offset portions 151 of fingers 149 are adapted to act as a fulcrum point when the fingers are spread by admission of the tips 118 of arcuate shaped movable contact blade 117. Fingers 149 are held in compressive current interchange relation with a stud terminal post 155 by means of the compression springs 152. The terminal post is threaded at its upper end for receiving an appropriate lead wire, not shown. In order to eliminate pitting between the offset portion 151 and stud post 155, an auxiliary current path is provided from the fingers to a metallic terminal block 156 supporting the stud post through the agency of thin shunt strips 157. Electrical connection between the shunt strips 157 and the terminal block 156 is effected by compression through the medium of rivets 144, see FIG. 14. The terminal block 156 has a top portion in which stud post 155 is threaded and a back portion which closes the arcing cavities 138 and prevents discharge of gases therefrom during the arcing process.

At least one of the fiber discs 137 is provided with a radial hole or slot 158 for the purpose of admitting the arcuate movable contact blade 117. The tips 150 of the stationary contact fingers 149 extend into the circular portion of the discs 137 so that engagement with the movable blade tips 118 may be effected. The location of the stationary finger tips 150 is substantially diametrically opposite from the contact admitting holes 158.

As explained earlier, the arcuate blades 117 are carried on individual movable contact arms 100, 101 and the blades are serially connected to each other at least by means such as a rivet 119. Thus, when the interrupting switch is closed, there is formed a series circuit originating at one of the terminal studs 155, passing through each of the stationary contacts 140 and the movable blade 117 and terminating at the opposite stud 155.

Arcuate blades 117 may be of substantially the same lengths so that when movable contact arms 100, 101 are swung jointly in a clockwise direction, see FIGS.. 12 and 13, while the unit is conducting, arcs are simultaneously drawn in the pressure and exhaust chambers 130 and 131. Under this circumstance the gases incident to arcing in the pressure chamber 130 are expelled through cross blast tube 132 and into the exhaust chamber 131. Gas is also generated in the exhaust chamber but it is fully relieved through the plurality of small holes 143 and it is furthermore swept out by the high velocity gases projected across the exhaust chamber arc from the cross blast tube 132. After the arc is extinguished and the interrupter switch is in its full open position as in FIG. 13, dielectric fluid is replaced in the arcing structure by ingress through holes 142, 143 and 159, for example.

It was indicated earlier that the recloser executes a number of the opening operations followed by a number of closing operations, and that if the fault is permanent, the recloser locks out. The mechanism for causing lockout of the interrupter by causing plunger 11 to descend permanently for the purpose of opening up the interrupter switch contacts is generally indicated by the toggle link mechanism identified by the reference numeral 26 in FIG. 1. A more detailed description of the lockout mechanism may be found in the above-cited Van Ryan patent, but for the present purpose it is sufficient to appreciate that lockout occurs whenever trip finger 25 is struck by integrating piston extension stem 15 and the toggle link assembly 26 breaks. Attention is now invited to the novel integrating piston assembly and its related parts which are so constructed as to enable convenient selection of the total number of interrupter operations prior to lockout and the independent selection of the total number of fast operations which precede the slow or retarded operations. Integrating piston 13, see FIG. 3, is adapted to advance in steps toward escape orifice 45 each time the interrupter operates. Likewise, when the integrating piston 13 is elevated to its ultimate position, trip piston extension stem 15 is also raised toward proximity with trip finger 25. When the trip finger 25 is struck by extension 15, the toggle link mechanism breaks causing lockout, after which the integrating piston 13 is free to resettle to its lowermost position wherein it resides in FIG. 3. After manually resetting the interrupter as described in the Van Ryan patent, integrating piston 13 will have resettled and prepared itself for repeating its full number of operations prior to lockout.

Note that the integrating piston is provided with an integral extension neck portion 165 to which is attached a sleeve-like coupling member 166 provided with an annular shoulder 167 bearing against a stop 168. Coupling sleeve 166 is attached to piston neck 165 by means of a removable pin 169 adapted to reside in any one of a plurality of axially spaced holes 170 in the lower diametrically reduced portion 171 of the coupling. In FIG. 3, it will be observed that pin 169 resides in the lowermost of the holes 170 so that integrating piston rests substantially at the bottom of cylinder 14. With this adjustment, integrating piston 13 is required to advance several steps before it blocks escape orifice 45 and corresponds to adjusting the interrupter for executing a like number of fast operations followed by a number of retarded operations established by means to be explained shortly hereinafter.

Figure 8:
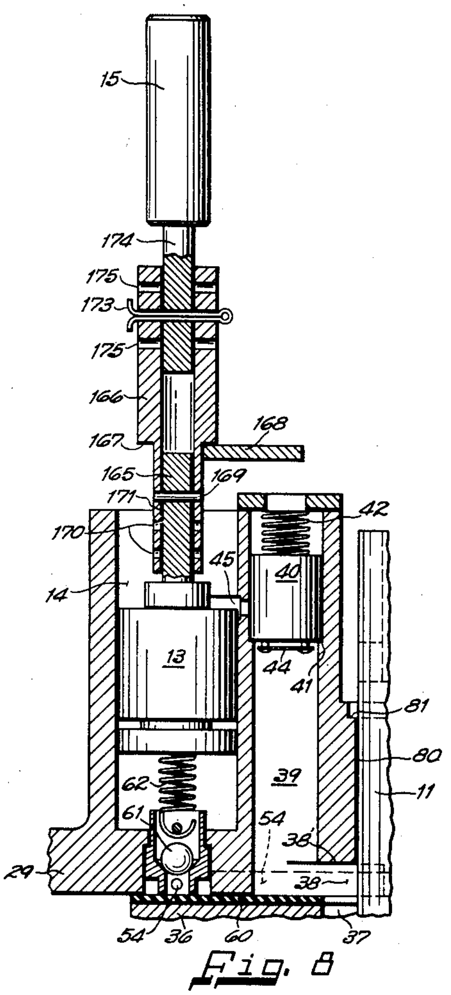
FIG. 8 is a sectional view showing a portion of the mechanism similar to that shown in FIG. 3 but with the integrating piston in an initially advanced position.
Figure 9:
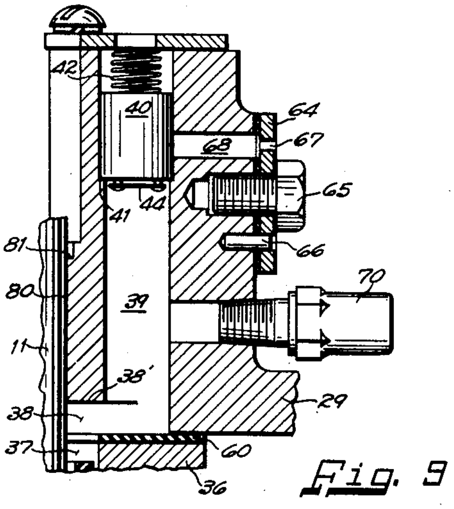
FIG. 9 is a sectional view taken on the line 9—9 of FIG. 7, with parts broken away.

Comparing FIG. 3 with FIG. 8 it will be seen that the latter figure shows the integrating piston 13 advanced axially upward into coupling 166 by causing pin 169 to be set in the uppermost of the series of three holes 170 in the restricted portion 171 of the coupling member. Thus, in FIG. 8 integrating piston 13 is elevated to a position where only one fast operation of the interrupter will advance the piston to a position where it blocks escape orifice 45 after which there will be a selected number of retarded operations. From the construction just described it is seen that selection of the number of fast and retarded operations is made very convenient in contrast to the prior art procedure of substituting an integrating piston with greater or less axial height, but preferably of the same weight, in order to establish its initial position with respect to the escape orifice.

Stop 168 which supports coupling 166 and accordingly establishes the original height of integrating piston 13 also permits the coupling to depart from said stop in an axial direction in accordance with movement of the piston. It is readily apparent that the initial axial distance from shoulder 167 of the coupling to the upper end of the trip piston extension stem 15 is a determining factor as to how many steps the integrating piston must take before the trip finger 25 is struck to cause lockout. This choice can also be conveniently made in the field through the provision of a split pin 173 which allows adjustment of trip piston extension stem 15 axially of the coupling 166. To facilitate this adjustment, stem 15 has a portion 174 of reduced diameter arranged for telescoping inside the bore of coupling 166 and a plurality of axially spaced holes 175 are also provided for receiving the cotter pin in its various positions.

When the extension stem 15 is positioned as in FIG. 3, the interrupter is set to execute four operations prior to lockout, that is, four operations occur before the upper end of extension stem 15 strikes trip finger 25 for releasing lockout mechanism 26. In FIG. 8 it is seen that stem 15 is advanced upwardly one hole so that there will be only three operations prior to lockout. This is also a great convenience since it enables a customer to choose any number of operations to lockout in order to obtain proper coordination with other reclosers in the power system without being required to follow the prior art practice of stocking interchangeable integrating piston assemblies for accomplishing the same purpose.

Thus, it is seen that there has been described in considerable detail a recloser that facilitates discretionary selection of its operational sequence, and inherently times each operation with precision so that circuit interruption will be effected through the agency of a novel interrupting switch means at the most appropriate time to the end that coordination and usefulness of the device will be enhanced.

Although only a preferred embodiment of the invention has been illustrated and described the disclosure is not to be interpreted as limiting, for the invention may be variously embodied and is to be construed in accord with the claim which follows.

It is claimed:

An arc extinguishing device of the liquid immersed type, comprising an insulating cross blast tube, a pressure generating chamber and an exhaust chamber each having one end wall aperture in substantial registry with the bore of the tube, said pressure chamber having another substantially imperforate end wall and said exhaust chamber having an end wall provided with a plurality of exhaust perforations, said last named end walls being opposite from the said apertured walls respectively, the portions of said chambers between said end walls comprising a plurality of substantially identical stacked apertured insulating discs whose axes are in substantial parallelism with said tube, elongated tension means holding said tube and the insulating discs of said pressure generating and exhaust chambers in axial compression against the axial blast forces generated when arcing occurs, at least one of the discs in each chamber being discontinuous for defining a contact admitting hole directed radially with respect to the axis of the tube, stationary contact means disposed interiorly of each chamber and substantially opposite said radial holes, contact arm means pivotally mounted for swinging movement about an axis parallel to the axis of said tube and displaced therefrom, a pair of movable contact blades carried on the arm means and each having a curvature whose center is in coincidence with the pivotal axis of said contact arm means and which intersects said stationary contact means and said radial hole, so that said movable contact blades will move closely through said radial holes and into and out of engagement with the stationary contact means upon swinging movement of said contact arm means, the movable contact blade in said exhaust chamber being spaced from said perforate wall so that oil and ionized gases may exhaust from said opening regardless of the position of said blades.

References Cited in the file of this patent

UNITED STATES PATENTS

| | | |
|---|---|---|
| 1,934,454 | Spurgeon | Nov. 7, 1933 |
| 2,627,566 | Leeds | Feb. 3, 1953 |
| 2,647,973 | Umphrey | Aug. 4, 1953 |
| 2,692,925 | Schindler | Oct. 26, 1954 |
| 2,734,972 | Van Ryan et al. | Feb. 14, 1956 |

FOREIGN PATENTS

| | | |
|---|---|---|
| 413,751 | Great Britain | July 26, 1934 |
| 479,850 | Great Britain | Feb. 11, 1938 |